US009653798B2

(12) United States Patent
Zhang et al.

(10) Patent No.: US 9,653,798 B2
(45) Date of Patent: *May 16, 2017

(54) ANTENNA APPARATUS, ANTENNA SYSTEM, AND ANTENNA ELECTRICAL TILTING METHOD

(71) Applicant: Huawei Technologies Co., Ltd., Shenzhen (CN)

(72) Inventors: Tingting Zhang, Wuhan (CN); Jisong Wang, Shenzhen (CN); Shoubo Xie, Shenzhen (CN); Shubao Pei, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,064

(22) Filed: Jan. 11, 2013

(65) Prior Publication Data

US 2013/0127666 A1 May 23, 2013

Related U.S. Application Data

(63) Continuation of application No. PCT/CN2011/078991, filed on Aug. 26, 2011.

(30) Foreign Application Priority Data

Nov. 23, 2010 (CN) .......................... 2010 1 0555649

(51) Int. Cl.
*H04W 16/00* (2009.01)
*H01Q 3/00* (2006.01)
(Continued)

(52) U.S. Cl.
CPC ............... *H01Q 3/00* (2013.01); *H01Q 1/246* (2013.01); *H01Q 3/005* (2013.01); *H01Q 3/06* (2013.01); *H01Q 3/34* (2013.01); *H04W 16/28* (2013.01)

(58) Field of Classification Search
CPC .................................................... H04B 5/0031
(Continued)

(56) References Cited

U.S. PATENT DOCUMENTS 4,888,592 A * 12/1989 Paik et al. .................... 342/359
6,075,330 A * 6/2000 Terk .............................. 318/280
(Continued)

FOREIGN PATENT DOCUMENTS

CN 1399480 A 2/2003
CN 1541430 A 10/2004
(Continued)

OTHER PUBLICATIONS

Rejection Decision of Chinese Application No. 201010555649.1, mailed May 31, 2013, 18 pages (with partial translation).
(Continued)

*Primary Examiner* — Wen Huang
(74) *Attorney, Agent, or Firm* — Slater Matsil, LLP

(57) ABSTRACT

Embodiments of the present invention provide an antenna apparatus, a system, and an adjusting method. The antenna apparatus is configured to be used in conjunction with an RCU (remote control unit, external remote control unit). The antenna apparatus includes a readable and writable memory and a motor. The readable and writable memory is configured to store configuration data of an antenna and antenna information corresponding to the configuration data, where the configuration data is used to control the RCU to drive the motor to move, so as to adjust an electrical down-tilt angle of the antenna.

8 Claims, 4 Drawing Sheets

(51) Int. Cl.
*H01Q 1/24* (2006.01)
*H01Q 3/06* (2006.01)
*H01Q 3/34* (2006.01)
*H04W 16/28* (2009.01)

(58) Field of Classification Search
USPC .................. 455/25, 63.4, 562.1, 575.7, 97
See application file for complete search history.

(56) References Cited

U.S. PATENT DOCUMENTS

| | | | |
|---|---|---|---|
| 6,198,458 | B1 | 3/2001 | Heinz et al. |
| 7,286,844 | B1 * | 10/2007 | Redi et al. .................. 455/522 |
| 8,354,959 | B2 * | 1/2013 | Ahlberg .................. 342/372 |
| 2001/0051532 | A1 | 12/2001 | Voyer |
| 2003/0109231 | A1 | 6/2003 | Marcus et al. |
| 2004/0038714 | A1 * | 2/2004 | Rhodes et al. ............. 455/562.1 |
| 2004/0070491 | A1 * | 4/2004 | Huang et al. ................ 340/10.5 |
| 2005/0003873 | A1 * | 1/2005 | Naidu et al. ................ 455/575.7 |
| 2006/0066443 | A1 * | 3/2006 | Hall ............................ 340/10.5 |
| 2006/0066494 | A1 | 3/2006 | Trejtnar et al. |
| 2007/0290935 | A1 | 12/2007 | Franzon et al. |
| 2007/0296552 | A1 | 12/2007 | Huang et al. |
| 2008/0036670 | A1 | 2/2008 | Arvidsson et al. |
| 2008/0198017 | A1 | 8/2008 | Hesselbarth et al. |
| 2008/0300022 | A1 * | 12/2008 | Dong et al. ................ 455/562.1 |
| 2009/0141623 | A1 * | 6/2009 | Jung et al. .................... 370/229 |
| 2009/0146894 | A1 * | 6/2009 | Drexler et al. .............. 343/757 |
| 2011/0151932 | A1 * | 6/2011 | Kim .......................... 455/562.1 |
| 2012/0056692 | A1 * | 3/2012 | Moon .................... H01P 1/184 333/136 |

FOREIGN PATENT DOCUMENTS

| | | |
|---|---|---|
| CN | 2872622 Y | 2/2007 |
| CN | 102136630 A | 2/2007 |
| CN | 101057367 A | 10/2007 |
| CN | 101057368 A | 10/2007 |
| CN | 101129076 A | 2/2008 |
| CN | 101252713 A | 8/2008 |
| CN | 201397879 Y | 2/2010 |
| EP | 1067626 B1 | 6/2006 |
| EP | 1962374 | 8/2008 |
| WO | WO03079484 | 9/2003 |
| WO | 2006057613 A1 | 6/2006 |
| WO | 2008154514 A2 | 12/2008 |
| WO | 2009069842 A1 | 6/2009 |
| WO | 2010021418 A1 | 2/2010 |
| WO | WO2012130366 | 10/2012 |

OTHER PUBLICATIONS

Second Chinese Office Action of Chinese Application No. 201010555649.1 mailed Mar. 11, 2013, 17 pages.
Written Opnion of the International Searching Authority received in Patent Cooperation Treaty Application No. PCT/CN2011/078991, mailed Dec. 8, 2011, 12 pages. (Partial Translation).
International Search Report and Translation received in Patent Cooperation Treaty Application No. PCT/CN2011/078991, mailed Dec. 8, 2011, 2 pages.
Chinese Search Report of Application No. 2010105556491 dated Dec. 24, 2012, 2 pages.
First Chinese Office Action of Chinese Application No. 201010555649.1 mailed Jan. 4, 2013, 15 pages.
LS on Antenna Interface Standards Group (AISG), 3 GPP TSG RAN Meeting #19, RP-030122, R4-030348, Mar. 11-14, 2003, 61 pages.

* cited by examiner

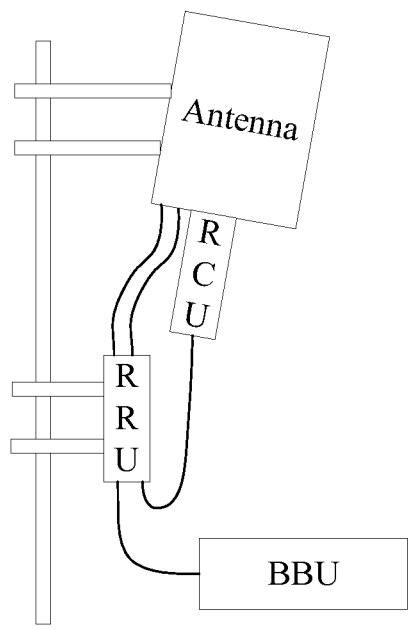
FIG. 1    (Prior Art)
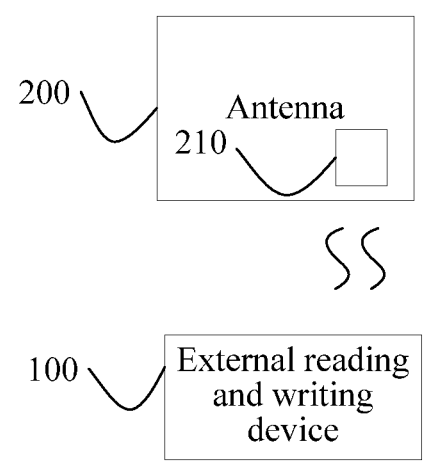
FIG. 2

ANTENNA APPARATUS, ANTENNA SYSTEM, AND ANTENNA ELECTRICAL TILTING METHOD

This application is a continuation of co-pending International Application No. PCT/CN2011/078991, filed Aug. 26, 2011, which claims priority to Chinese Patent Application No. 201010555649.1, filed Nov. 23, 2010, both of which applications are incorporated herein by reference.

TECHNICAL FIELD

The present invention relates generally to the field of communications, and in particular embodiments, to an antenna apparatus, an antenna system, and an antenna electrical tilting method in a base station system.

BACKGROUND

Electrical tilting antennas have become the mainstream in mobile communication systems. An electrical tilting antenna refers to a mobile antenna for which the down-tilt angle is adjusted electrically. A maintenance system located in a base station adjusts the electrical down-tilt angle of the antenna for network optimization.

FIG. 1 is a schematic diagram of a base station system including an electrical tilting antenna, which includes an antenna tower, an antenna, a remote control unit (RCU), a remote radio unit (RRU), and a base band unit (BBU). The RRU is connected with the antenna and used for receiving and transmitting signals by using the antenna. A motor is arranged inside the RCU, and the motor is connected with a phase shifter (not shown in the figure) inside the antenna through a transmission apparatus (for example, a connecting rod, not shown in the figure). During operation, the motor drives, through the transmission apparatus, the phase shifter to move, thereby adjusting the electrical down-tilt angle of the antenna. During the adjustment process, configuration data for controlling the driving and moving length is different because of different types of antenna phase shifters and different transmission and moving distances. The RCU needs to load different configuration data for different antennas having different antenna phase shifters, so that the RCU can move in a correct route and correctly adjust the electrical down-tilt angle of the antenna. This requires identifying an antenna device first, recording information about each antenna when the antenna device is added to the base station maintenance system, and loading correct configuration data to the RCU according to the information, so that the electrical tilting antenna is correctly and precisely controlled by using the RCU to control the movement of the phase shifter.

A data configuration method adopted in the prior art is that: at the system installation and configuration phase, after installing the RCU on the tower, the installation personnel write down information such as the RCU serial numbers and corresponding antenna frequency bands, and then add the RCU to the base station maintenance system and configure relevant data for each RCU to control the antennas corresponding thereto. During the process of implementing the present invention, the inventor finds that in practice, the following cases tend to occur: an RCU serial number may be written down incorrectly, or a serial number written down does not correspond to that of the RCU, or the RCU serial number written down does not match the information of the antenna to be actually connected. These cases result in incorrect information on the base station maintenance platform and incorrect configuration for the antennas. Consequently, the network fails to be optimized correctly. To correct the information, the installation personnel need to mount over the tower and read and write down the information again, causing repeated operations which wastes manpower and resources.

If the RCU is built in the antenna and the configuration data is already loaded when the RCU is delivered from the factory, only sector information of the antenna needs to be recorded at the installation site. However, this causes a problem that the RCU occupies the internal volume of the antenna, resulting in a large antenna volume. And if the RCU board and motor are built in the antenna, if the board or motor is faulty, it is difficult to dismantle them, and even if they are dismantled, the antenna is damaged and cannot be maintained.

SUMMARY OF THE INVENTION

An embodiment of the present invention provides an antenna, configured to be used in conjunction with an Remote Control Unit (RCU), and including a readable and writable memory which is configured to store configuration data of the antenna and antenna information corresponding to the configuration data, where when the configuration data is loaded to the RCU, the RCU is enabled to drive a motor to move according to the configuration data, so as to adjust an electrical down-tilt angle of the antenna.

An embodiment of the present invention further provides an antenna system, including an antenna apparatus and an RCU used in conjunction with the antenna apparatus, where the antenna apparatus includes a readable and writable memory and a motor.

The readable and writable memory is configured to store configuration data of an antenna and antenna information corresponding to the configuration data, where when the configuration data is loaded to the RCU, the RCU drives the motor inside the antenna to move according to the configuration data to adjust an electrical down-tilt angle of the antenna.

An embodiment of the present invention further provides an antenna electrical tilting method, including the following steps. Configuration data that corresponds to antenna information is retrieved and stored in a readable and writable memory inside an antenna according to the antenna information. The configuration data is loaded to an RCU. A motor inside the antenna is driven to move according to the configuration data to adjust electrical down-tilt angle of the antenna.

In the embodiments of the present invention, a readable and writable memory is disposed inside an antenna to store corresponding configuration data of the antenna, so that an external device can conveniently call the configuration data to configure the RCU and to remotely control the electrical down-tilt angle of the antenna. This reduces the human error rate, reduces the installation cost, improves the accuracy of project implementation, and facilitates maintenance.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 is a schematic diagram of a base station system using an antenna of the prior art;

FIG. 2 is a schematic structural diagram of an antenna according to an embodiment of the present invention;

DETAILED DESCRIPTION OF ILLUSTRATIVE EMBODIMENTS

Figure 3:
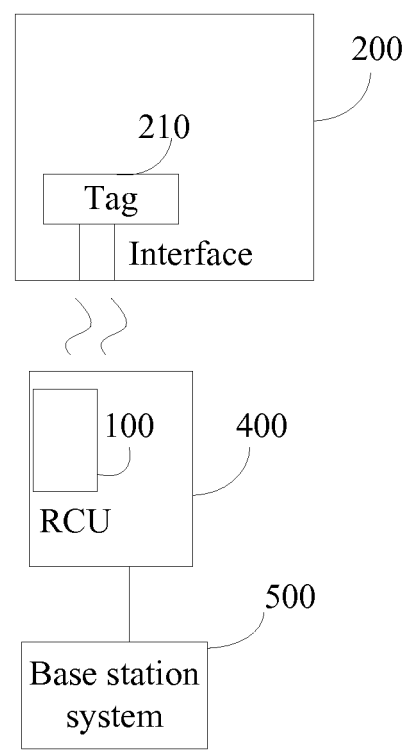
FIG. 3 is a schematic structural diagram of an antenna according to another embodiment of the present invention.

To make the objective, technical solutions, and advantages of the present invention clearer, the present invention is described below in further detail with reference to specific embodiments and relevant accompanying drawings.

An embodiment of the present invention provides an antenna apparatus, configured to be used in conjunction with an RCU (remote control unit, e.g., external remote control unit), and including a motor, a phase shifter, and a readable and writable memory.

The readable and writable memory is configured to store configuration data of an antenna and antenna information corresponding to the configuration data, where when the configuration data is loaded to the RCU, the RCU is enabled to drive the motor to move according to the configuration data. The antenna information optionally includes one or more of all antenna models, antenna frequency bands, and antenna serial numbers, so that the RCU can obtain the configuration data of the corresponding antenna to be loaded to the RCU from the readable and writable memory according to the antenna models in the antenna information, or obtain the configuration data of the corresponding antenna to be loaded to the RCU according to the antenna frequency bands.

The motor is configured to drive, through rotation thereof, the phase shifter to move to adjust the electrical down-tilt angle of the antenna. It should be understood that after the RCU loads the configuration data of the antenna, the motor may drive the phase shifter to move according to an instruction issued by the RCU to adjust the electrical down-tilt angle of the antenna. Alternatively, after the RCU loads the configuration data of the antenna, the motor may be connected with the phase shifter of the antenna through a structural transmission part, and then drive the structural transmission part to move when the motor is operating, so as to drive the phase shifter of the antenna to move.

In the embodiment of the present invention, a readable and writable memory is disposed inside an antenna to store corresponding configuration data of the antenna, so that an external device can conveniently call the configuration data to configure the RCU and to remotely control the electrical down-tilt angle of the antenna. This reduces the human error rate, reduces the installation cost, improves the accuracy of project implementation, and facilitates maintenance.

Referring to FIG. 2, an embodiment of the present invention provides an antenna 200, and a readable and writable storage unit 210 is installed inside the antenna 200. Configuration data and antenna information of the antenna may be written to the readable and writable storage unit 210 during production. The antenna information inside the readable and writable storage unit 210 includes information such as antenna frequency bands, antenna serial numbers, and configuration data of antennas of all models. Optionally, an external reading and writing device 100 is installed outside the antenna 200. The external reading and writing device 100 performs read and write operations on the readable and writable storage unit 210 inside the antenna, first reads the antenna information, then retrieves the configuration data of the corresponding antenna 200 from the readable and writable storage unit 210 inside the antenna 200 according to information such as the antenna model in the antenna information, and then loads the configuration data to an RCU, thereby correctly adjusting the electrical down-tilt angle of the antenna.

It can be seen that the external reading and writing device 100 may be a separate device, or may be built in a tower mounted device which is connected with the antenna, for example, an RCU, or a tower mounted amplifier (Tower Mounted Amplifier, TMA).

In the base station system, to facilitate system maintenance, a visualization window unit connected with the RCU and configured to obtain antenna information may be added. A query command is delivered through the visualization window unit to control the external reading and writing device to perform the operation of obtaining the antenna information, thereby easily and conveniently obtaining the required antenna information and configuring the antennas. If the configuration data of the antenna is changed later, the antenna configuration data of the readable and writable memory inside the antenna may also be changed through the visualization window unit.

Optionally, data may be communicated between the readable and writable storage unit 210 inside the antenna and the external reading and writing module 100 by using wired communication or wireless communication.

Referring to FIG. 3, data is communicated between the readable and writable storage unit 210 inside the antenna 200 and the external reading and writing module 100 by using wireless communication. The readable and writable storage unit 210 inside the antenna 200 is an electronic label RFID Tag (radio frequency identification tag). The external reading and writing device 100 is optionally built in an RCU 400. The RCU 400 may obtain antenna information directly from the electronic label RFID Tag of the antenna 200, read configuration data from the electronic label RFID Tag according to the antenna information, and load the configuration data to the RCU 400. Here, a base station system 500 may obtain, through a query command, information about the antenna connected with the RCU, or deliver a command to directly load the configuration data to the RCU.

Figure 4:
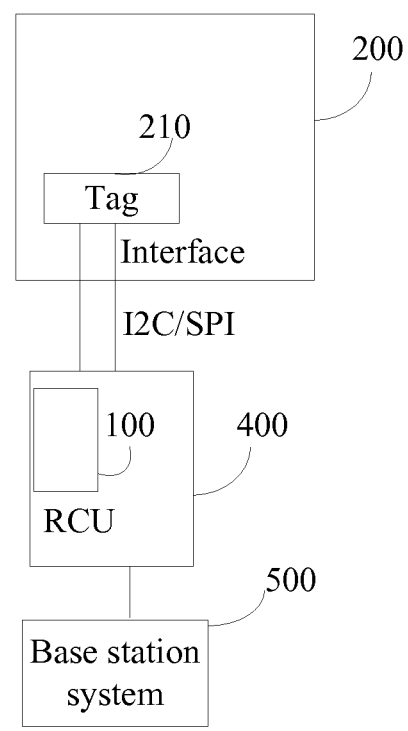
FIG. 4 is a schematic structural diagram of an antenna according to another embodiment of the present invention.

Referring to FIG. 4, a device connected with an antenna is connected with a storage chip board inside the antenna through connection wires to provide power supply and control signals required by the storage chip inside the antenna. Signal interfaces on the wires may be I2C or SPI interfaces.

It should be understood that, in the embodiment of the present invention, since a readable and writable memory is disposed inside an antenna to store corresponding configuration data of the antenna, an external device can conveniently call the configuration data to configure the RCU. In this manner, the RCU serial number and antenna information can be automatically recognized. For example, during project installation, it is not necessary to manually write down the RCU serial numbers and antenna information. A corresponding relationship between the RCU and the antenna is obtained by using a query function of the base station. In addition, the configuration data in the storage unit inside the antenna is read and automatically loaded to the RCU.

In addition, the project installation time is reduced, and the error rate caused by manually writing down information is reduced. For example, the error rate of writing down and inputting information is inevitable, which is prone to mistakes, wastes time, and increases the cost. After this solution is used, the human mistakes will be avoided, and the project quality and installation efficiency will be improved.

As another feature, future maintenance is facilitated. For example, if an electrical tilting antenna is faulty and software or configuration data is lost, the configuration data needs to be loaded again, which requires mounting over the tower to write down RCU and corresponding information again. By using this solution, however, the antenna information corresponding to the RCU may be automatically obtained to acquire the configuration data, thereby achieving automatic loading.

Figure 5:
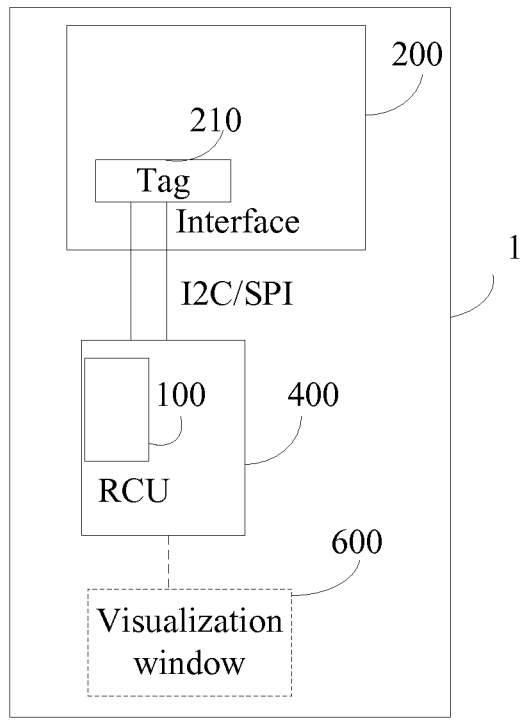
FIG. 5 is a schematic structural diagram of an antenna system of the present invention.

Referring to FIG. 5, an antenna system 1 provided by an embodiment of the present invention includes an antenna apparatus 200, an external reading and writing device 100, and an RCU 400. The external reading and writing device 100 is built in the RCU 400.

As described in the foregoing embodiments, the antenna apparatus may be used in conjunction with an external remote control unit, and the antenna apparatus includes a phase shifter, a readable and writable memory, and a motor. The phase shifter is configured to adjust an electrical down-tilt angle of the antenna. The motor is configured to drive the phase shifter to move to adjust the electrical down-tilt angle of the antenna. The readable and writable memory is configured to store configuration data of the antenna and antenna information corresponding to the configuration data. When the configuration data is loaded to the RCU, the RCU drives the motor inside the antenna to move according to the configuration data, so as to drive the phase shifter inside the antenna to move, thereby adjusting the electrical down-tilt angle of the antenna.

In this embodiment, the external reading and writing device 100 is configured to perform read and write operations on the readable and writable storage unit 210 inside the antenna. The external reading and writing device 100 first reads the antenna information, then retrieves the configuration data of the antenna 200 from the readable and writable storage unit 210 according to the antenna information, and then loads the configuration data to the RCU 400.

Optionally, the antenna system 1 further includes a visualization window unit 600. A query command is delivered through the visualization window unit 600 to control the external reading and writing device 100 to obtain the antenna information.

In the embodiment of the present invention, a readable and writable memory is disposed inside an antenna to store corresponding configuration data of the antenna, so that an external device can conveniently call the configuration data to configure the RCU and to remotely control the electrical down-tilt angle of the antenna. This reduces the human error rate, reduces the installation cost, improves the accuracy of project implementation, and facilitates maintenance.

Figure 6:
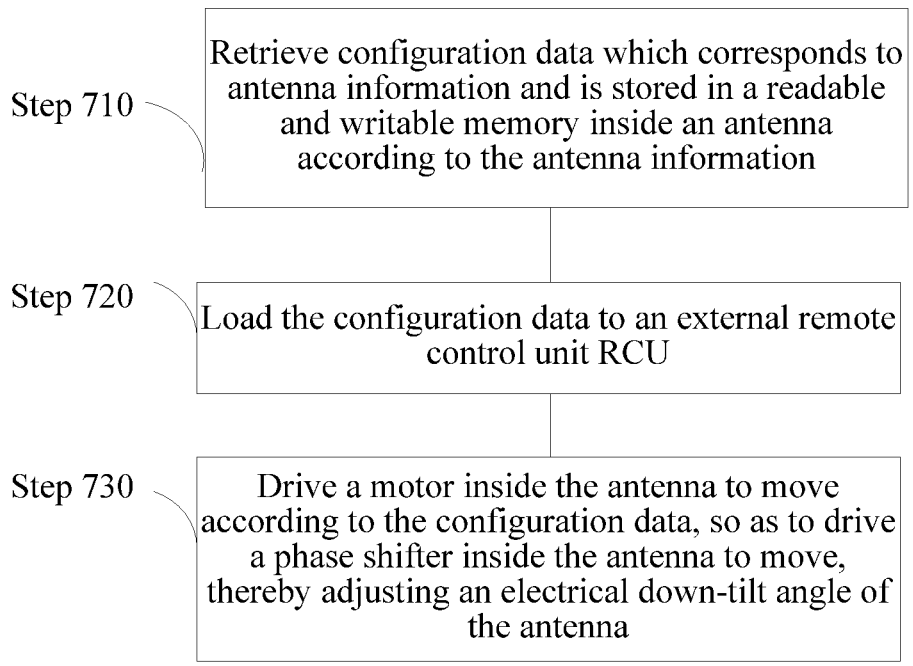
FIG. 6 is a flowchart of an antenna electrical tilting method of the present invention.

Referring to FIG. 6, an embodiment of the present invention further provides an antenna electrical tilting method, including the following steps.

Step 710: Retrieve configuration data which corresponds to antenna information and is stored in a readable and writable memory inside an antenna according to the antenna information.

Step 720: Load the configuration data to an RCU.

Step 730: Drive a motor inside the antenna to move according to the configuration data, so as to drive a phase shifter inside the antenna to move, thereby adjusting an electrical down-tilt angle of the antenna.

It should be understood that the antenna information optionally includes one or more of all antenna models, antenna frequency bands, and antenna serial numbers, so that the RCU can obtain the configuration data of the corresponding antenna to be loaded to the RCU from the readable and writable memory according to the antenna models in the antenna information, or obtain the configuration data of the corresponding antenna to be loaded to the RCU according to the antenna frequency bands.

In the embodiment of the present invention, a readable and writable memory is disposed inside an antenna to store corresponding configuration data of the antenna, so that an external device can conveniently call the configuration data to configure the RCU and to remotely control the electrical down-tilt angle of the antenna. This reduces the human error rate, reduces the installation cost, improves the accuracy of project implementation, and facilitates maintenance.

Persons of ordinary skill in the art should understand that all or a part of the processes of the method according to the embodiments may be implemented by a computer program instructing relevant hardware. The program may be stored in a computer readable storage medium. When the program is run, the processes of the method according to the embodiments are performed. The storage medium may be a magnetic disk, an optical disk, a Read-Only Memory (ROM), or a Random Access Memory (RAM).

Although the objectives, technical solutions, and advantages of the present invention have been described in detail above through the exemplary embodiments, it should be understood that the above descriptions are merely exemplary embodiments of the present invention, and are not intended to limit the present invention. All modifications, equivalent replacements, and improvements made without departing from the spirit and principle of the present invention shall fall within the protection scope of the present invention.

What is claimed is:

1. A method, comprising:
an antenna apparatus storing configuration data and antenna information in a memory, wherein the antenna information comprises an antenna serial number of an electrical tilting antenna comprised in the antenna apparatus and an antenna model of the electrical tilting antenna, and the configuration data defines a moving length specific to at least one of the antenna serial number and the antenna model; and
the antenna apparatus providing the configuration data for the antenna apparatus to a remote control unit (RCU), wherein the moving length is used for the RCU to control movement of the electrical tilting antenna so as to set a down tilt angle of the electrical tilting antenna.

2. The method of claim 1, wherein the memory comprises an electronic label radio frequency identification (RFID) tag.

3. An antenna system comprising:
an antenna apparatus comprising an electrical tilting antenna; and
a memory storing antenna information of an electrical tilting antenna controlled by the antenna apparatus and storing configuration data corresponding to the electrical tilting antenna, wherein the antenna information comprises an antenna serial number and an antenna model of the electrical tilting antenna, and wherein the configuration data defines a moving length specific to at least one of the antenna serial number and the antenna model;
wherein the memory comprises a radio frequency identification (RFID) tag.

4. The antenna system according to claim 3, wherein the antenna apparatus transfers the antenna information and the configuration data to a remote control unit (RCU).

5. The antenna system according to claim 3, wherein the antenna information and the configuration data are read by a remote control unit (RCU) automatically.

6. The antenna system according to claim 3, wherein the antenna information and the configuration data are read by a remote control unit (RCU) without manual input.

7. The antenna system according to claim 3, wherein the antenna apparatus provides the antenna information of the electrical tilting antenna and the configuration data corresponding to the electrical tilting antenna from the memory to a remote control unit (RCU) via wireless communication.

8. The antenna system according to claim 3, further comprising a visualization window unit that delivers a query command to a remote control unit (RCU) to control the RCU to read the antenna information.

* * * * *